April 20, 1965          D. R. HOYT          3,179,200
BATTERY RETAINER APPARATUS
Filed July 30, 1962          3 Sheets-Sheet 1
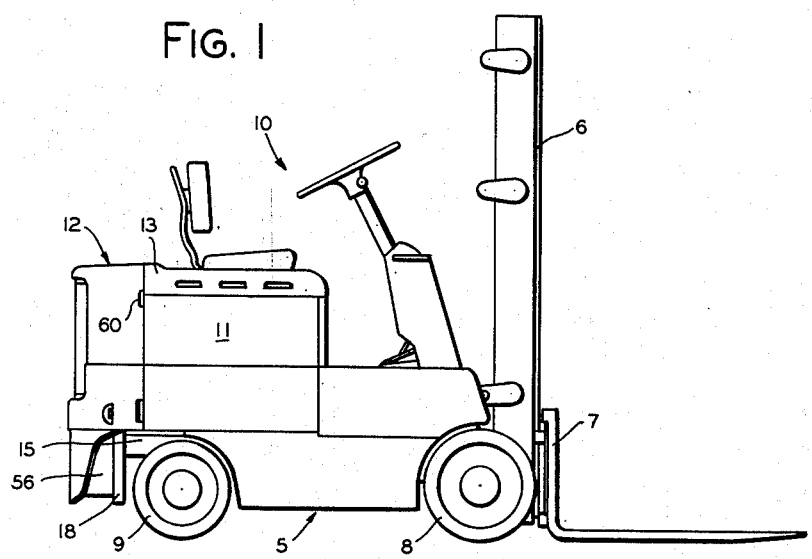
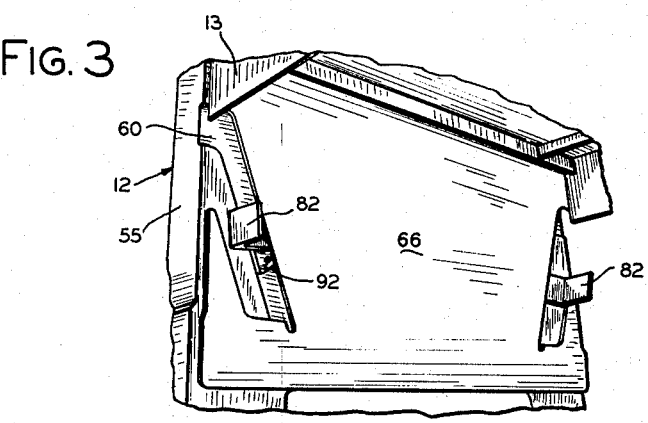
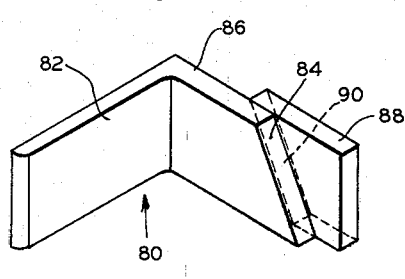
INVENTOR
DERYL R. HOYT
BY
*J. C. Wiessler*
ATTORNEY

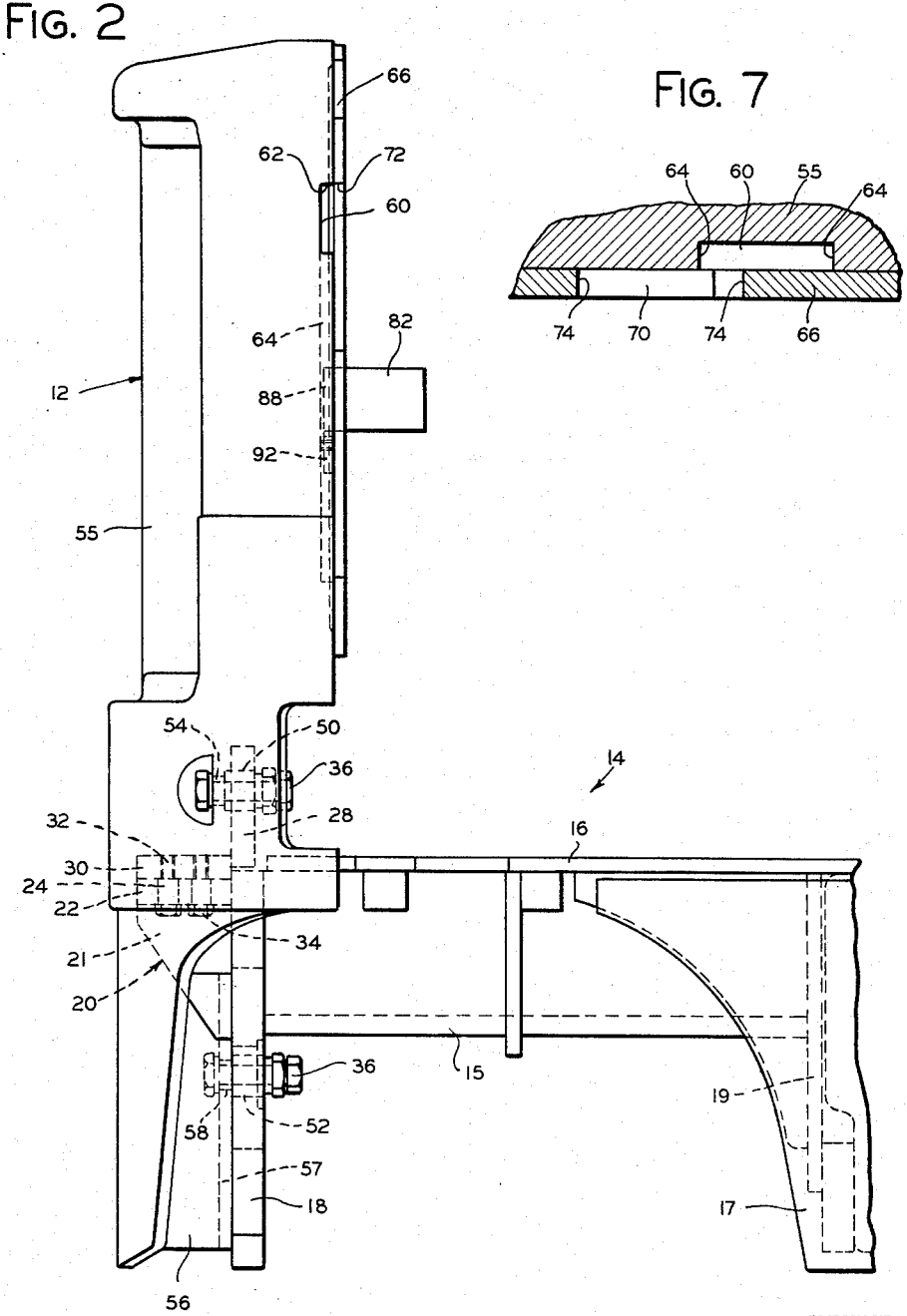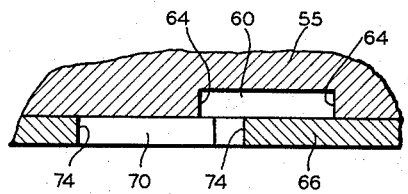

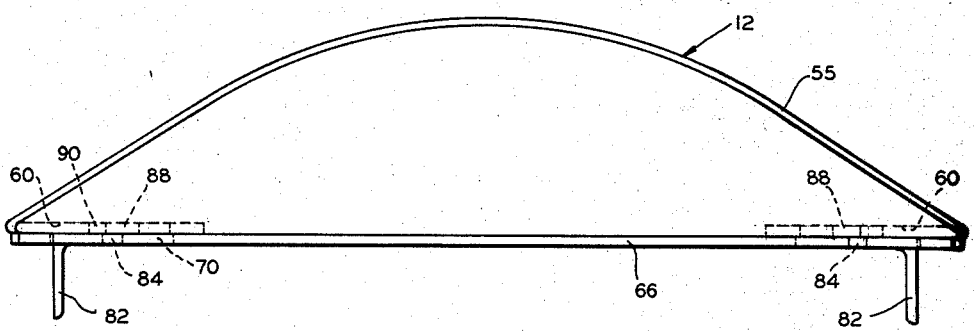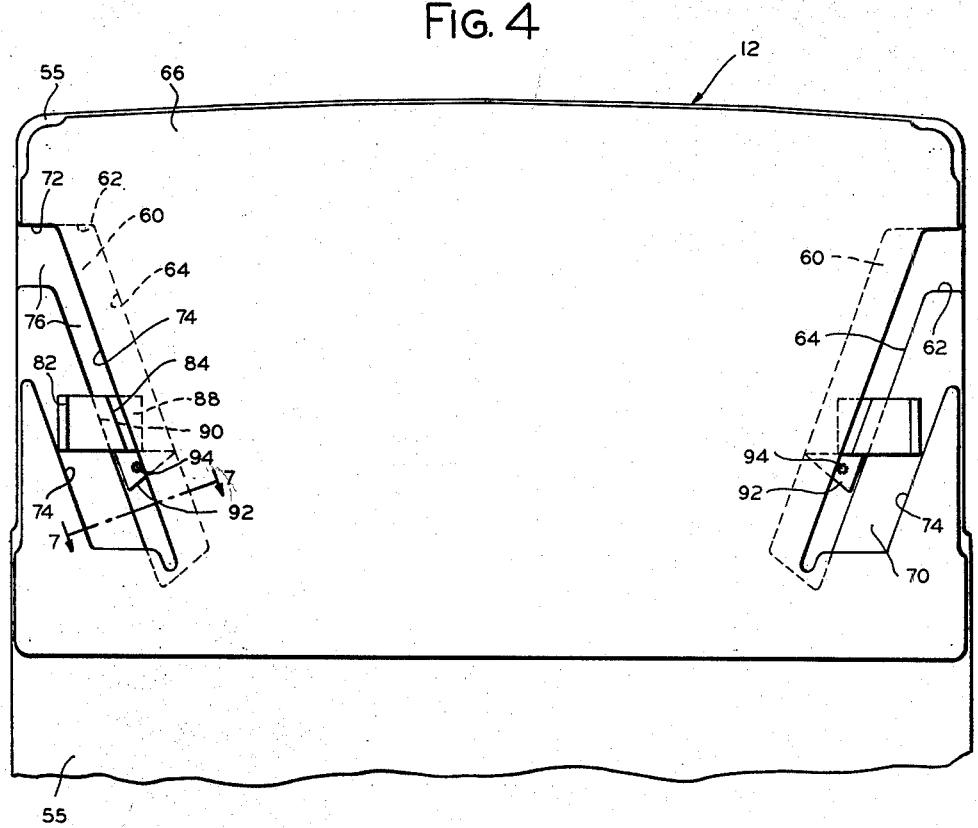

United States Patent Office 3,179,200
Patented Apr. 20, 1965

3,179,200
BATTERY RETAINER APPARATUS
Deryl R. Hoyt, Battle Creek, Mich., assignor to Clark Equipment Company, a corporation of Michigan
Filed July 30, 1962, Ser. No. 213,297
17 Claims. (Cl. 180—68.5)

This invention relaes to battery retainer apparatus, and more particularly to an adjustable battery retainer construction for electric powered lift trucks.

In my copending application Serial No. 72,420, filed November 29, 1960, now Patent No. 3,061,034, issued October 30, 1962, is disclosed a novel counterweight adjustment device by means of which a standard lift truck frame construction may be used in conjunction with a longitudinally adjustable counterweight so that the standard frame construction may be utilized with batteries of different capacities which vary in size. The present invention provides a unique construction which is particularly well adapted for use with lift trucks and by means of which the size of the battery compartment may be adjusted in a direction transverse of the truck. It is well adapted to be combined with the invention of my aforementioned copending application, in which combination a universally adjustable compartment for batteries and the like in certain types of vehicles is effected while using a standardized vehicular frame construction.

Aside from the advantages to be gained in combining the present with the previous invention, the present invention is directed to the transverse adjustment construction per se.

One of the primary objects of the present invention is therefore to provide a vehicular frame construction which embodies improved means for adjusting the size of a compartment in a direction transverse of the vehicle.

Another object of the invention is to provide improved battery retainer apparatus for electric driven lift trucks and the like wherein any size battery within maximum and minimum limits may be mounted and positively retained upon the truck.

These and other objects, advantages and features of the present invention will become apparent as the description proceeds.

In a preferred form of the invention I provide a pair of transversely spaced bracket members which extend into the battery compartment of an electric lift truck, for example, for holding the sides of one end of a battery mounted in said compartment in a predetermined position, which bracket members are slidable in angled slots which are formed in a portion of the truck construction extending transverse of one end of the vehicle and which extend in downwardly converging relation at a predetermined angle so that said bracket members are slidably adjustable along said slots for varying the distance therebetween. Stops are provided for maintaining the bracket members in any preselected position lengthwise of the slots, the angle of said slots relative to the horizontal being such that sidewise pressure against the bracket members will not dislodge the bracket members lengthwise of the slots, thus providing a positive and readily adjustable retainer apparatus.

For exemplary purposes only, I will hereinafter describe my invention as it is used in electric type lift trucks, although it should be clearly understood that the invention is in no sense intended to be restricted to such exemplary use.

Now, in order to understand more clearly my invention, reference should be had to the detailed description below taken in conjunction with the drawings in which:

FIGURE 1 illustrates an electric lift truck of the counterbalanced type which utilizes this invention;

FIGURE 2 is an enlarged broken-away side elevation showing the rear portion of the main frame of the truck of FIGURE 1;

FIGURE 3 is a broken-away perspective view looking upwardly towards the rear of the truck and inside the battery compartment thereof;

FIGURE 4 is a broken-away front view in elevation of the upper portion of FIGURE 2;

FIGURE 5 is a plan view of FIGURE 4;

FIGURE 6 is a perspective view of one of the retainer brackets used in my invention; and FIGURE 7 is a sectional view taken along line 7—7 of FIGURE 4.

Referring now to the drawings, numeral 5 designates an electric counterbalanced lift truck of generally conventional design including a lifting mast assembly 6 having a lifting carriage and fork 7 mounted for vertical movement thereon, forward drive wheels 8, rear steer wheels 9, an operator's station and control means 10, and a battery compartment 11 formed within the body, main frame and counterweight construction of the truck. The counterweight is shown at numeral 12 and a coverhood at 13.

The rear portion of the main frame 14 comprises a battery support floor 16, a transverse rear vertical frame member 18, an inner pair of transversely spaced, longitudinally extending frame members 15, one of which is shown, secured at the rear ends to frame members 18, at the upper edges to support floor 16 and at the forward ends to an outer pair of transversely spaced, longitudinally extending main frame members 17 by means of a transverse frame member 19. A bracket assembly 20 is also a part of the rigid standardized main frame assembly shown and comprises a pair of transversely spaced inverted right triangular gusset members 21 secured at the vertical legs thereof to the rear surface of members 18 and having secured to the base thereof a rearwardly extending support plate 22. A plurality of openings 24 are formed in plate 22 intermediate gussets 21 and are aligned with threaded holes 32 in a horizontal leg portion 30 which forms with a vertical leg portion 28 an L-shaped turn-around or adjustable frame member, bolts 34 securing the L-shaped frame member 28, 30 to member 22.

The counterweight 12 comprises a heavy metal casting or forging 55 of the configuration shown in the drawings which is adapted to counterbalance in a well-known manner loads carried by the fork carriage assembly 7. A U-shaped bracket 56 is secured to the lower inner central portion of the forging 55 and has a base 57 disposed as shown with a central opening 58 therein. The counterweight 12 is attached to the frame 14 of the lift truck by means of three bolts and threaded bushing assemblies 36, two of which are shown. A pair of transversely spaced threaded openings 50 are located in the vertical leg portion 28 of the L-shaped frame member and a threaded opening 52 is located centrally of the rear vertical frame member 18. In order to assemble the counterweight on the main frame of the truck the counterweight is positioned relative to frame member 18 and vertical leg portion 28 such that opening 58 is in alignment with opening 52, and openings 54 are aligned with openings 50, whereupon the bolt and bushing assemblies 36 are projected through the three aligned openings and tightened to secure the counterweight to the main and auxiliary frame members of the truck. The relative longitudinal position of the counterweight 12 relative to the main frame 14 is adjustable by properly utilizing various lengths of bolt and bushing assemblies 36, sleeve members, not shown, associatable therewith, an additional U-shaped spacer member 56, and by selectively positioning the L-shaped frame member so that the vertical leg 28 thereof is located forwardly or rearwardly of horizontal leg 30, as desired. The construction of the lift truck frame and counterweight locating and connecting means described thus far is disclosed and claimed in detail in my aforementioned patent, and does not in itself constitute a part of the present invention.

The upper portion of the counterweight 12 extends substantially vertically above support floor 16 and forms a unitary construction with the lower portion thereof, said upper portion being of a width equal to the width of the body section of the truck and having a configuration as illustrated. In the forward face of the counterweight adjacent each opposite side thereof is formed a slot 60 of predetermined width and depth and having a first horizontally inwardly extending portion 62 and a downwardly extending biased portion 64. Portion 64 is preferably biased at a relatively steep angle in relation to a horizontal plane for a purpose to be explained. For example, it has been found advantageous to dispose slot portion 64 such that it forms an angle of approximately 110° with horizontal portion 62. A cover plate 66 forms an abutment or back rest plate at the rear of the battery compartment and is secured, as by welding, to the forward face of the counterweight. Plate 66 is dimensionally substantially coextensive with the upper and side surfaces of the counterweight and extends downwardly to a location substantially above floor section 16. A pair of slots 70 are formed in plate 66; each includes a horizontally inwardly extending portion 72 and an intersecting downwardly biased portion 74. When plate 66 is secured to the forward vertical surface of the counterweight in proper location, as shown in the drawing, horizontally extending portions 62 and 72 of slots 60 and 70 are in partial overlapping relation, as are downwardly biased portions 64 and 74 of said slots. Downwardly extending portion 74 of slot 70 is preferably biased at the same angle as is portion 64 of slot 60, horizontal portion 72 is of substantially less length than horizontal portion 62, and the depth of the slot 60 in the counterweight may be substantially the same as the thickness of plate 66.

When plate 66 is secured to the counterweight, as shown, it will be apparent that a generally Z-shaped slot configuration is formed between the contiguous surfaces of the counterweight and plate 66 which form slots 60 and 70. That is, the overlapping portions of slots 60 and 70 form a central slot portion 76 of a depth equal to the sum of the depths of slots 60 and 70 and comprises the center "leg" of the generally Z-shaped slot configuration. That portion of each slot 60 which extends transversely inwardly of each central slot portion 76 is located between the facing surfaces of the counterweight and plate 66, whereas the corresponding portion of each slot 70 which is located transversely outwardly of common slot portion 76 extends forwardly from the forward surface of the counterweight through plate 66.

A pair of right and left hand brackets 80, one of which is shown in detail in FIG. 6, are adapted to be received in the Z-shaped slots and are readily locatable in said slots in any position along the lengths of common slot portions 76. Each bracket 80 is preferably constructed of a right angle bracket portion 82 having a biased end edge 84 extending downwardly at an angle relative to the upper edge 86, the bias of edges 84 being equal to the bias of slots 60 and 70 in a right and left hand sense as between the pair of brackets. An overlapping straight bracket portion 88 is secured to the rear surface of each bracket portion 82 adjacent biased edge 84 and has a biased edge 90 which is complementary to biased edge 84. The thickness of bracket portion 88 is preferably equal to or slightly less than the depth of slot 60 and the thickness of bracket portion 82 is also equal to or slightly less than the thickness of plate 66, whereby brackets 80 may be inserted in the corresponding Z-shaped slots 60 and 70 from the upper ends thereof by sliding bracket portions 88 inwardly of the common horizontal slot portions 76 and into underlying slots until biased edges 90 contact the inward biased edges of common slot portions 76, in which position the brackets 80 may be moved downwardly along the slots, being thereby maintained in positions wherein the forwardly extending portions 82 extend parallel to floor section 16. The overlapping portion of members 82 and 88 is of somewhat less width than the transverse width of the downwardly biased portion of each common slot 76 in order to provide compensation for slight irregularities in the side surface of a battery, for example, to be retained by the pair of brackets on floor section 16.

A pair of triangular shaped stop members 92 are adapted to maintain brackets 80 in a predetermined position in the respective slots, being receivable in slots 60, as shown, and adjustable lengthwise thereof. Each stop is held in any selected location in the slot by means of a set screw 94 which is projectible into rigid abutment with the adjacent counterweight surface which forces the stop forwardly into abutment with the rear surface of plate 66 in order to maintain it in a selected location. The configuration of each stop member 92 is such as to provide a horizontal surface upon which each bracket 80 rests when the stop member is inserted in slot 60.

In practice my invention has been found to be a relatively simple, low-cost and efficient means for providing adjustability in vehicular compartments of the type contemplated. In battery operated lift trucks, for example, the width of the battery to be installed is, of course, known. Depending upon the width of the battery, stops 92 are located in the slots so that the forwardly extending portions of bracket sections 82 will engage the sides of the battery upon insertion of the brackets in the slots as above-described, and downward adjustment thereof to a position of abutment with the upper edge of stops 92. Following installation of stops 92 in proper spaced relation for retention of a battery of given width, one of the brackets 80 is inserted in a corresponding Z-shaped slot and adjusted downwardly into abutment with the upper edge of the stop, whereupon the battery may be located on floor section 16 with the rear surface thereof in abutment with the forward surface of plate 66 and the side surface adjacent the said bracket in abutment with the vertical surface of the forwardly extending leg 82 thereof. With stops 92 properly located the battery is now in a central location relative to the axis of the truck and the second bracket may be installed in the other slot and adjusted downwardly until the forwardly extending leg of the bracket engages the opposite side surface of the battery. With the second bracket in such engaging position the lower edge thereof is preferably slightly above (⅛″, for example) the upper horizontal surface of adjacent stop 92 so that in operation the second bracket will "settle" into a position in which it will, in conjunction with the first bracket, grip the battery firmly. This is important to prevent the battery from tending to move slightly from side to side between the brackets, particularly if mounted on rollers, which would tend to cause a hammering action between the brackets. Then, in the event the first-mentioned bracket is removed from its slot, and the battery removed from the opposite side of the truck, the last-mentioned stop 92 will be in position to support the second bracket. The bias of the downwardly extending portions of the slot configuration is such that the brackets are prevented from being dislodged upwardly in the slots when subjected to transverse loads which may be imposed thereon by the battery, as, for example, when negotiating turns or operating on a transverse slope.

When it is time for the battery to be replaced one of the brackets 80 is removed from its slot whereupon the battery may be removed from the truck. It will be noted that the other bracket is retained in its preselected position by the other stop 92, and the same or equal battery may be reinstalled without further adjustment. If a different size of battery is to be installed for any reason, stops 92 are adjusted equally upwardly or downwardly in the respective slots, whereupon the new battery may be installed in a retained central position in which brackets 80 are located in a second adjusted position. The range of adjustment of the brackets extends from the lower end of the common slot portion 76 to an upper adjusted position in which each bracket is located with the upper edge thereof substantially aligned with the lower horizontal surface of slot section 62. It will be understood that side pressure of the battery causes biased edge 90 of bracket portion 88 to frictionally engage the outer edge of the biased portion 64 of slot 60. A clearance between biased edge 84 of bracket portion 82 and the inner edge of biased portion 74 of slot 70 is present so that the bracket 80 is readily adjustable and insertable in the Z-shaped slot and also may adjust itself laterally to compensate for slight irregularities in the side surfaces of the battery. The inwardly extending portion 88 of the bracket holds the bracket in the slot when the battery is removed from engagement with the brackets.

It should be noted that my invention may be used without stop members 92. However, there is some disadvantage in this in that upon removal of the battery following removal of one of the brackets 80 the other bracket will descend to the bottom of the slot, and also there may be a tendency on the part of mechanics to install the battery in an off-center position with the brackets in engagement with the sides of the battery at different elevations. However, use of my invention without utilization of stops is well within the scope of the invention.

Although only one embodiment of my invention has been illustrated and described, it will be apparent to persons skilled in the art that various changes in the structure and relative arrangement of parts may be made to suit individual requirements without departing from the scope of the invention.

I claim:

1. In a vehicle having a counterweight means mounted in vertically disposed location upon a vehicular frame and extending transversely thereof, a compartment forwardly of the counterweight for housing a device and supporting the same from the frame and adjacent one side of the counterweight, said counterweight having formed therein on the side thereof adjacent said compartment a downwardly and inwardly extending slot having a generally Z-shaped cross-section and bracket means insertable in said slot having portions disposable in each portion of said Z-shaped slot and an additional portion extending into said compartment, said bracket means being locatable in different positions of elevation in said slot for engaging a portion of the device adapted to be housed in said compartment.

2. In an electric battery driven lift truck having a longitudinally extending frame, a vertically extending counterweight supported at one end of said frame and a battery compartment disposed forwardly of the counterweight assembly, means for adjusting the effective width of said compartment comprising a downwardly and inwardly extending slot having a generally Z-shaped cross-section formed adjacent each side of the counterweight in the portion thereof adjacent said compartment, and bracket means insertable in each of said slots having portions located in each of the leg portions of each Z-shaped slot and an additional retainment portion extending forwardly into said compartment, said bracket means being adjustable lengthwise of said slots for varying the transverse distance between said forwardly extending portions thereof whereby to retain between said latter portions battery means of varying dimensions locatable in said compartment.

3. In a vehicular frame having a horizontally extending framework and a vertically extending frame portion secured to said framework and forming therewith a portion of a vehicular compartment, retainment means extending longitudinally of said compartment for adjusting the effective transverse dimension thereof comprising a bracket means having a forwardly extending leg and a transversely extending leg, a biased downwardly and inwardly extending slot formed in the forward portion of said vertically extending frame portion adjacent at least one side thereof, said slot including longitudinally and transversely spaced openings extending transversely of the compartment and connected by a common longitudinally extending opening, said transverse leg of said bracket means being of a configuration which complements at least a portion of said slot and is receivable therein and adjustable lengthwise of the downwardly and inwardly extending bias of the slot to provide a variable dimension between the longitudinally extending portions of the retainment means.

4. A counterweight construction for lift trucks and the like forming a portion of a vehicular compartment, comprising a slot in an upright surface thereof which extends transversely of one side of the counterweight and thence downwardly and inwardly on a bias to provide an elongated track, a plate member secured to said upright surface and having a slot therein which also extends transversely of one side thereof and thence downwardly and inwardly on a bias substantially the same as the bias of the first mentioned slot, said plate member being secured to the upright surface of the counterweight such that the first and second mentioned slots together form a downwardly and inwardly extending biased slot construction having a cross-section of generally Z-shaped configuration, and bracket means insertable in and movable to selected adjusted positions along said Z-shaped slot for adjusting the effective transverse dimension of the compartment.

5. A construction as claimed in claim 4 wherein said plate member overlaps a portion of the slot in said counterweight and said counterweight underlaps an opposite portion of the slot in said plate member, said slots together having a common central open portion which comprises the center leg of said Z-shaped configuration.

6. A construction as claimed in claim 5 wherein said bracket means includes a first portion which is insertable in and substantially complements the track formed by the first and second mentioned slots, and a second portion which extends forwardly of said plate member.

7. A construction as claimed in claim 4 wherein stop means is provided in one of said slots for fixing the downward adjusted position of said bracket means.

8. A construction as claimed in claim 4 wherein complementary slot means is provided in the opposite side portion of said counterweight and plate member, and a bracket means complementary to the first mentioned bracket means insertable therein, said first and second bracket means being adjustable upwardly and downwardly on the bias in the respective Z-shaped slots for varying the distance between the forwardly extending portions of the first and second bracket means.

9. An adjustment device comprising a first member, complementary slots formed in a surface of said first member and extending transversely inwardly from opposite sides thereof and thence inwardly on a predetermined bias in converging relation to each other, a second member adapted to overlie said first member and having formed therein a second pair of complementary slots extending transversely inwardly from opposite sides thereof and thence downwardly and inwardly in converging relation on a bias similar to the bias of said pair of first mentioned slots, said second member being secured to said first member such that the said second pair of slots with said first pair of slots forms a pair of tracks of generally Z-shaped cross-section, and a pair of bracket means insertable in said tracks having portions complementing portions of the Z-shaped openings formed in said tracks and movable along said tracks for varying the distance between the bracket means.

10. An adjustable compartment comprising first means having a surface forming one side of the compartment, a pair of slots extending from opposite sides of the first means in inwardly converging relation, a second pair of slots also extending from opposite sides of said means in inwardly converging relation on substantially the same bias as said first pair of slots overlying a portion only of said first pair of slots and having an outer edge more closely adjacent the adjacent outer side of said means than is the outer edge of the contiguous first slot whereby to form a pair of complementary tracks of generally Z-shaped cross-section, and a pair of complementary bracket means insertable in and movable longitudinally of said tracks to selected adjusted positions for varying the distance therebetween, said bracket means having portions extending transversely outwardly of said means for effectively varying the dimension of said compartment between said extending portions.

11. An adjustable battery compartment for electric trucks having a longitudinally extending frame and a vertically extending counterweight supported from one end of said frame, comprising a pair of downwardly converging slots formed in the forward surface of said counterweight and extending from the opposite sides thereof, means secured to the forward surface of said counterweight having a pair of complementary converging slots formed therein and extending downwardly therefrom from opposite sides thereof, said second pair of slots forming with said first pair of slots a pair of complementary tracks of generally Z-shaped cross-section, and a pair of complementary bracket means insertable in said pair of tracks and movable longitudinally thereof to a plurality of adjusted positions, said bracket means including forwardly extending portions which vary the distance therebetween at different adjusted positions of the bracket means, said bracket means being adapted to embrace opposite sides of a battery which is locatable in said compartment.

12. A construction as claimed in claim 11 wherein stop means are provided in said pair of tracks, a portion of said stop means underlying said secured means, said stop means being adjustable lengthwise of said pair of tracks for fixing the adjusted position of said pair of bracket means.

13. A construction as claimed in claim 11 wherein each said bracket means includes a pair of connected overlapping members which are received in different portions of respective ones of said tracks an intermediate portion thereof being formed on the bias of the respective track and extending through the portion of said track which connects each first and second slots.

14. A construction as claimed in claim 11 wherein the bias of said pair of first slots is such as to provide substantial lateral adjustment of said bracket means while prohibiting upward displacement of the bracket means in the respective track upon the application of a transverse force acting outwardly against the forwardly extending portion of either of said bracket means.

15. An adjustable battery compartment for electric trucks having a longitudinally extending frame and a vertically extending counterweight supported from one end of said frame, comprising a pair of downwardly converging slots formed in the forward surface of said counterweight, means secured to the forward surface of said counterweight having a pair of downwardly converging slots formed therein and overlapping a portion of said first-mentioned pair of slots, said second pair of slots forming with said first pair of slots a pair of complementary tracks, and a pair of complementary bracket means insertable in said pair of tracks and movable longitudinally thereof to a plurality of adjusted positions, said bracket means being adapted to embrace opposite sides of a battery which is locatable in said compartment and including forwardly extending portions which vary the distance therebetween at different adjusted positions of the bracket means.

16. A construction as claimed in claim 15 wherein the downwardly converging bias of said pair of tracks is such as to provide for substantial lateral adjustment of said bracket means while prohibiting upward displacement of the bracket means in the respective track upon the application of a transverse force acting outwardly against the forwardly extending portion of said bracket means.

17. A construction as claimed in claim 15 wherein stop means are provided in at least one of said tracks in underlying relation to the adjacent bracket means, said stop means being adjustable lengthwise of said track for fixing the adjusted position of said bracket means.

References Cited by the Examiner

UNITED STATES PATENTS

| | | | |
|---|---|---|---|
| 541,114 | 6/95 | Nolan | 248—224 X |
| 667,189 | 2/01 | Condict | 180—65 |
| 1,514,056 | 11/24 | Leitzen. | |
| 2,899,162 | 8/59 | Young. | |
| 2,954,951 | 10/60 | Dorothea | 248—309 X |
| 3,053,336 | 9/62 | Zednik | 180—68.5 |
| 3,061,034 | 10/62 | Hoyt | 180—68.5 |
| 3,071,728 | 1/63 | Grace et al. | 248—311 X |

FOREIGN PATENTS 304,578  3/55  Switzerland.

A. HARRY LEVY, *Primary Examiner.*